United States Patent [19]

Marsh

[11] Patent Number: 4,548,314
[45] Date of Patent: Oct. 22, 1985

[54] BUCKET ELEVATOR AND METHOD OF MAKING SAME

[76] Inventor: Preston Marsh, 74 W. Curtis Rd., R. #1, Hope, Mich. 48628

[21] Appl. No.: 488,032

[22] Filed: Apr. 25, 1983

[51] Int. Cl.⁴ ............................................. B65G 17/36
[52] U.S. Cl. .................................... 198/712; 198/713
[58] Field of Search .............. 198/712, 713, 714, 716, 198/731, 733, 648

[56] References Cited

U.S. PATENT DOCUMENTS

| 448,699 | 3/1891 | Underwood | 198/712 |
| 2,944,657 | 7/1960 | Davis et al. | 198/713 |
| 3,687,272 | 8/1972 | Eisenegger | 198/716 |

FOREIGN PATENT DOCUMENTS 1122922  4/1955  France ............................... 198/716

*Primary Examiner*—Joseph E. Valenza
*Assistant Examiner*—Michael Stone
*Attorney, Agent, or Firm*—John J. Swartz

[57] ABSTRACT

A bucket elevator including a bucket having a bottom wall and an integral, upwardly-extending rear wall. The bottom wall includes a longitudinal slot therein which receives one of a plurality of links of an endless link chain. A shield is provided to cover each link to inhibit product being conveyed from passing between laterally-spaced side bars of the link.

18 Claims, 8 Drawing Figures

BUCKET ELEVATOR AND METHOD OF MAKING SAME

BACKGROUND OF THE INVENTION

1. Field of the Invention

This invention relates to a bucket elevator for conveying product, such as grain, and more particularly to a bucket elevator including a new and improved bucket mounted on an endless link chain, as well as a new and novel method of making same.

2. Description of the Prior Art

Farm combines are typically provided with elevators for conveying farm product, such as grain or beans, from one level to another level. Such elevators have heretofore included a hollow elevator casing mounting an internal divider plate spanning the sidewalls of the casing, and a pair of sprocket wheels, around which is trained an endless link chain having a plurality of links which ride on the internal divider wall. One standard farm combine conveyor includes a plurality of upright paddles mounted on the links. Typically, the paddles project upwardly from the chain and push the beans or other farm product upwardly through the elevator casing for eventual discharge at the upper end thereof. Such paddles are resilient and yield to dirt and moisture. Moreover, such chain conveyors, mounting upright paddles, result in substantial friction and rubbing of the product as the paddles pass through the product.

One of the most serious drawbacks of this prior art construction is that there is a gap between the underside of the upwardly projecting paddles and the internal divider plate of the elevator casing. Accordingly, the paddles pass over a portion of the beans or other farm product lying on the divider plate, whereby a portion of the product remains in the casing. If the remaining product is subjected to moisture, the product will harden and will interfere with the proper operation of the conveyor.

Moreover, such paddle-type conveyors have a limited capacity because the paddles are not in wiping engagement with the inner wall or plate of the elevator casing. Accordingly, it is an object of the present invention to provide a new and novel bucket elevator having an increased capacity.

It has been found that a conveyor mounting buckets instead of paddles is substantially more effective, particularly for edible beans, as the buckets carry the beans as opposed to the paddles which push the beans. Accordingly, it is another object of the present invention to provide a new and novel bucket for a bucket elevator.

Chain-mounted buckets have been provided in various shapes and configurations, such as those illustrated in U.S. Pat. No. 448,699, issued to T. J. Underwood on Mar. 24, 1891; U.S. Pat. No. 2,919,792, issued to D. W. Kirkhart, et al on Jan. 5, 1960; and U.S. Pat. No. 2,944,657, issued to D. A. Davis, et al on Jul. b 12, 1960.

The buckets such as disclosed in the aforementioned Davis, et al patent are relatively complex and expensive to manufacture. Accordingly, it is another object of the present invention to provide a new and novel bucket and bucket elevator which is relatively simple and inexpensive to manufacture and install.

One of the problems associated with the manufacture and use of bean elevators is the inadvertent passage of the product being conveyed to a position between the sidebars of the chain link, whereby the beans are ground between the links and the sprocket wheel. This results in a loss of product, as well as creating foreign matter which contaminates the product and interferes with the proper operation of the conveyor. Accordingly, it is yet another object of the present invention to provide a new and novel bucket elevator, including a new wheel bucket having mechanism for inhibiting the passage of the product being conveyed to a position between the side bars of the chain links.

Still another object of the present invention is to provide a new and novel bucket for a bucket elevator which will be self-cleaning to minimize the accumulation of product being conveyed on the divider wall provided in the elevator casing.

Another problem closely attendant thereto is the undesirable collection of the product being conveyed between the laterally outer sides of the chain links and the adjacent portions of the bucket. The collected product is ground into small particles to contaminate the product and inhibit the free and proper operation of the chain. Accordingly, it is another object of the present invention to provide a new and novel bucket for a bucket elevator, whereby the bottom wall of the bucket abuts laterally opposite sides of the chain link on which it is mounted to inhibit the passage of the product between the bottom wall and the chain link.

A further object of the present invention is to provide a new and novel bucket elevator including a new and novel bucket and a new and novel cover for each link of a bucket carrying link chain.

A still further object of the present invention is to provide a new and novel method of making a bucket and a bucket elevator of the type described.

A still further object of the present invention is to provide a new and novel method of making a bucket for a bucket elevator, including the step of forming a chain link cover by severing the wall of a receptacle to form a top and then displacing the top out of the plane of the receptacle.

Other objects and advantages of the present invention will become apparent to those of ordinary skill in the art as the description thereof proceeds.

SUMMARY OF THE INVENTION

A bucket elevator for conveying product, such as beans, comprising a hollow tubular conveyor casing mounting sprocket wheel mechanism; an endless chain trained around the sprocket wheel mechanism and including a plurality of pivotally coupled links; and a bucket for conveying product mounted on at least one of the links, comprising a bottom wall and an integral, forwardly-extending back wall; the bottom wall, including a pair of laterally-spaced bottom wall segments, having laterally inner opposed, laterally-spaced terminal edges, separated by a slot, abutting the sides of the link. One aspect of the invention includes a cantileverally-supported, forwardly-projecting tab, having a rearward end integral with the rear wall, and a free forward end, in bearing engagement with the outer terminal surface of the link. Another aspect of the invention includes a new and novel method of making a bucket elevator and buckets for a bucket elevator.

BRIEF DESCRIPTION OF THE DRAWINGS

These and other objects of the present invention may more readily be understood by reference to the accompanying drawings, in which.

DESCRIPTION OF THE PREFERRED EMBODIMENT

Figure 1:
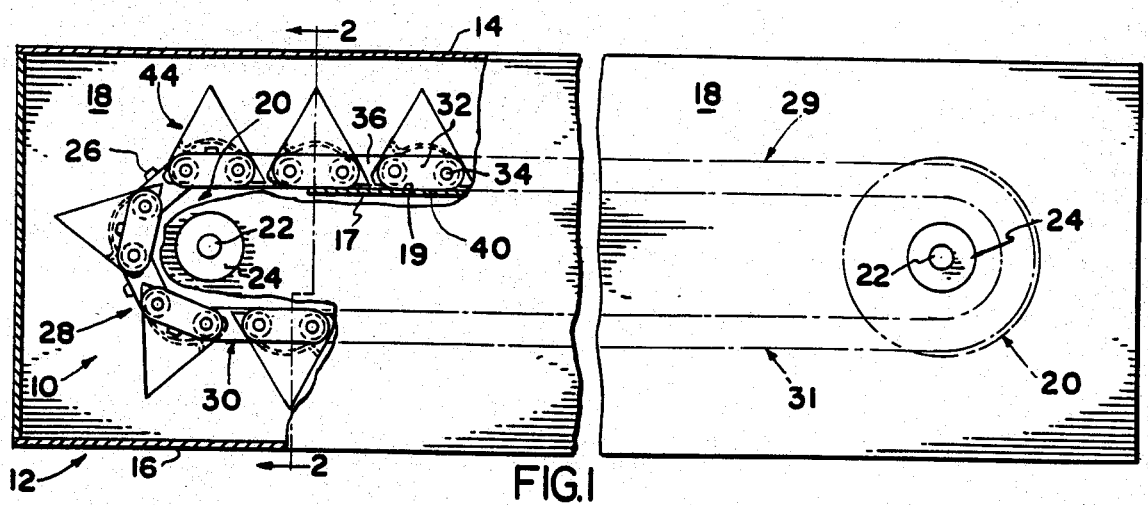
FIG. 1 is a partially sectional side elevational view of a bucket elevator constructed according to the present invention.

A bucket elevator constructed according to the present invention, generally designated 10, includes a hollow tubular elevator casing or conveyor channel, generally designated 12, including a top outer wall 14, bottom wall 16, and a pair of laterally-spaced, generally upstanding side walls 18 spanning the top and bottom walls 14 and 16. A divider wall 17 spans the side walls 18 intermediate the top and bottom walls 14 and 16. A pair of drive sprocket wheels, generally designated 20, are mounted on drive shafts 22 journalled in bearings 24 which are mounted on the side walls 18 at opposite ends of the divider wall 17, as usual. The sprocket wheels 20 include a plurality of circumferentially-spaced chain drive teeth 26, as usual.

Figure 2:
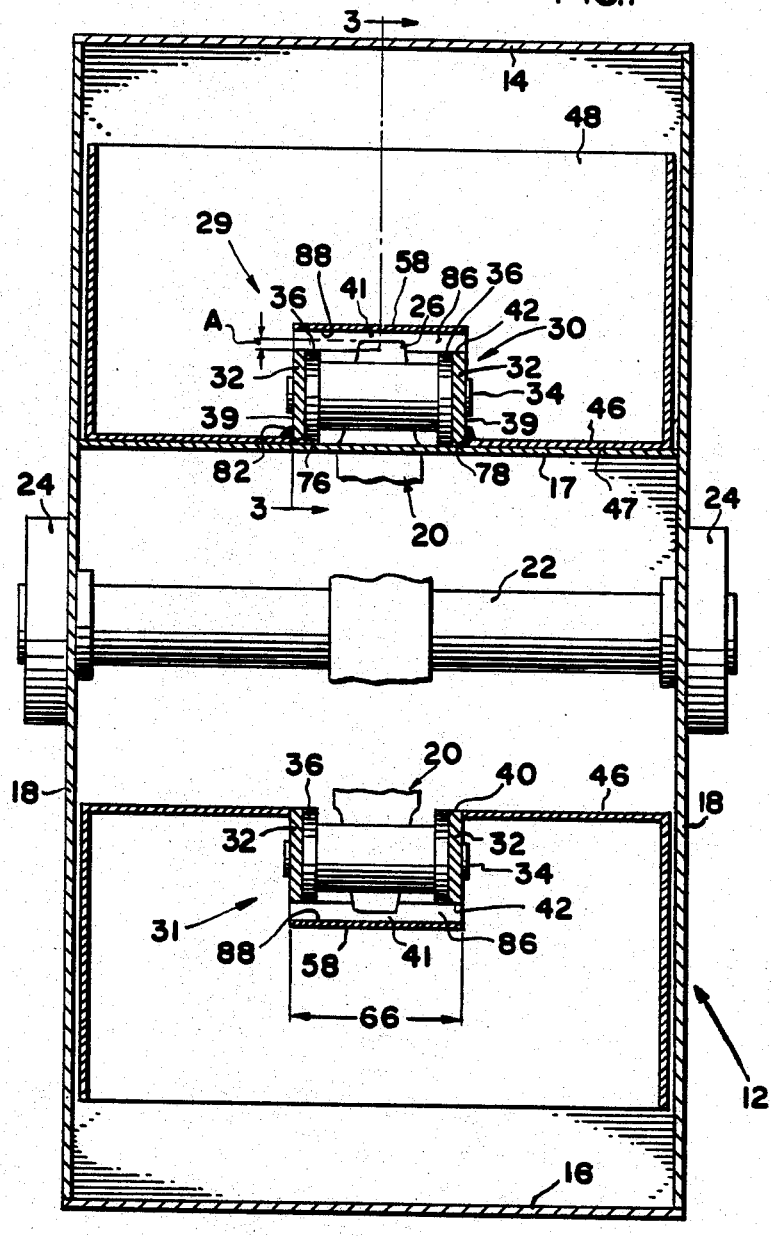
FIG. 2 is a greatly enlarged sectional end view, taken along the line 2—2 of FIG. 1 illustrating a bucket elevator constructed according to the present invention.
Figure 4:
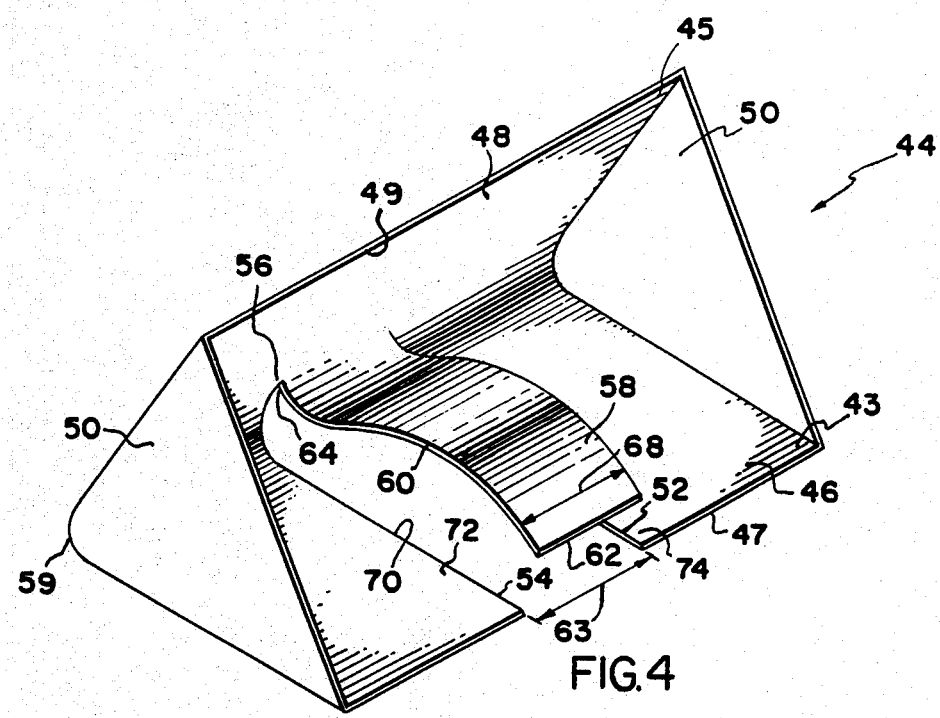
FIG. 4 is a perspective view of a bucket constructed to the present invention.
Figure 5:
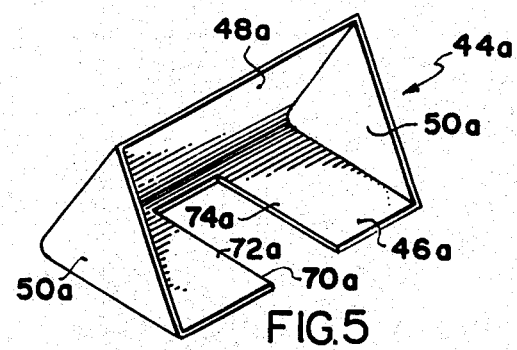
FIG. 5 is a perspective view illustrating a slightly modified bucket.
Figure 6:
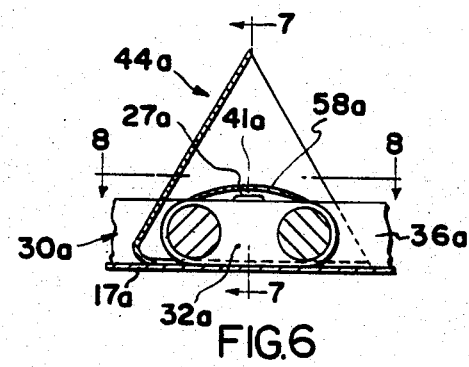
FIG. 6 is a side elevational sectional view illustrating a modified construction, taken along the line 6—6 of FIG. 8.
Figure 7:
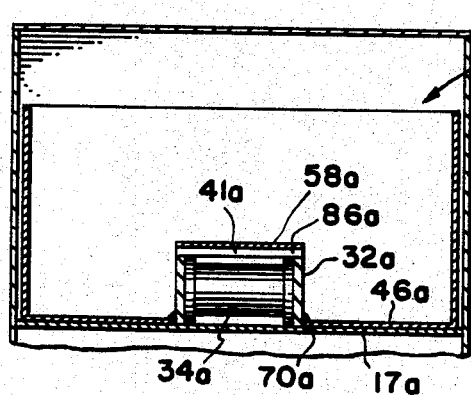
FIG. 7 is a sectional end view, taken along the line 7—7 of FIG. 6.
Figure 8:
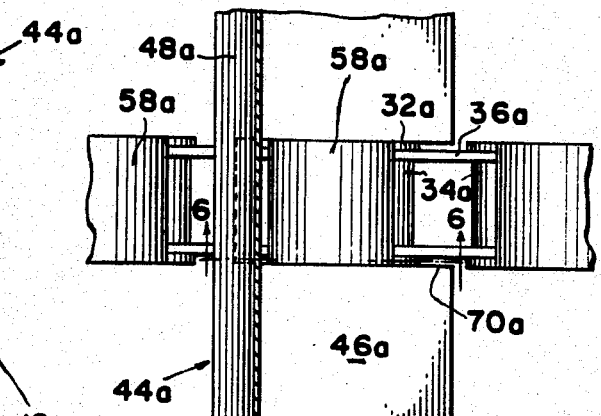
FIG. 8 is a top plan sectional view, taken along the line 8—8 of FIG. 6.

Trained around the sprocket wheels 20 is an endless link chain, generally designated 28, including upper and lower runs 29 and 31. The link chain 28 comprises a plurality of individual links, generally designated 30, each including a pair of laterally-spaced parallel side bars 32, coupled at opposite ends via transverse coupling pins 34. Each link 30 is coupled to the longitudinally adjacent links 30 via a pair of laterally-spaced parallel coupling bars 36 which are journalled on the pins 34 of adjacent links 30. Each of the side bars 32 includes a laterally outer face 39, bottom face 40, and top face 42. The bottom faces 40 of the links 30, comprising the upper chain run 29, slide along and bear against the upper surface 19 of the inner conveyor casing wall 17. The transverse pins 34 and side bars 32 of links 30 are spaced apart a sufficient distance to provide recesses 41 which receive the sprocket teeth 26 as the links 30 negotiate the sprocket wheels 20. As illustrated in FIG. 2, the sprocket teeth 26 are of such length that, when they are received, they project upwardly above the upper surfaces 42 of the side bars 32 by a distance A.

Mounted on each of the links 30 is a bucket, generally designated 44, including a generally planer bottom wall 46 integrally coupled to an upwardly, forwardly extending rear or back wall 48. A pair of generally triangularly-shaped side walls 50 span the laterally outer edges 43 and 45 of the bottom wall 46 and back wall 48, respectively. The underside 47 of each bucket 44 is in wiping engagement with the upper surface 19 of divider wall 17.

The length of divider wall 17 is less than the length of top, bottom and side casing walls 14, 16 and 18 to provide sufficient space for the chain 28 and buckets 44 to pass as they negotiate the sprocket wheels 20.

Figure 3:
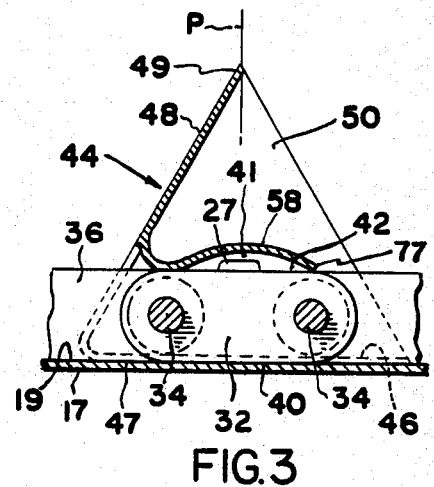
FIG. 3 is a fragmentary sectional side view particularly illustrating the link chain and one of the buckets, taken along the line 3—3 of FIG. 2.

In making the bucket 44 illustrated in FIG. 1, the bottom wall 46 and the lower portion of the back wall 48 are cut along parallel lines 52 and 54 extending rearwardly from the leading edge 47 of bottom wall 46 along the entire length of the bottom wall 46, and thence upwardly to a level 56 above the plane of bottom wall 46 to provide a cantileverally-spaced central strip or tab 58 which is then bent or displaced upwardly out of the plane of the bottom wall 46 to a level spaced above the plane of bottom wall 46, to the position illustrated in FIGS. 1 and 3. The distance between the plane of bottom wall 46 and a parallel plane intersecting level 56 is greater than the vertical height of links 30. The tab 58 is also longitudinally bent or displaced to provide an arcuate or outwardly curvilinear portion 60 between the leading forward edge 62 and the rearward terminal portion 64 which is integral with the rear wall 48. When the tab 58 is upwardly displaced to the position illustrated in FIGS. 1 and 3, a recess or gap 70 is provided between the laterally inner edge portions 72 and 74 of bottom wall 46 adjacent cut lines 52 and 54.

The distance 63 between the cut lines 52 and 54, and thus the width of slot 70, is equal to the distance 66 between laterally outer surfaces or faces 39 of the side bars 32. Accordingly, the width 68 of the tab 50 is equal to the width 66 of link 30.

One of the buckets 44 is installed on each of the links 30 by placing the abutting edge portions 72 and 74 into frictional engagement with the laterally outer lower terminal edge portions 76 and 78 of the side bar faces 39, and with the underside 47 of the bottom wall 46 being in bearing engagement with the upper surface 19 of interior wall 17. In this position, the tab 58 will bear against the upper surfaces 42 of the side bars 32 and will serve as a cover or shield for inhibiting product being conveyed from entering the recess 41 between the side bars 36. The leading edge 77 lies in a vertical plane intersecting the axis of the forward coupling pin 34. The material comprising the bottom wall 46 and back wall 48 may suitably comprise spring steel or the like which will yield when the tab 58 bears against the chain links 30.

Although the bucket 44 may be frictionally secured to the chain links 30, the bucket may be additionally secured via welds 82 at the junctions of side bars 32 and edge portions 72 and 74, or other suitable attachment mechanism.

The curvilinear tab portion 60 provides an underlying recess or gap 41 which receives the terminal portion 27 of sprocket teeth 26 as the chain link 30 negotiates the sprocket wheel. The gaps or openings 86 between the upper link side bar surfaces 42 and the underside 88 of the curvilinear portion 60 will also serve as a means of egress for any foreign material which may have been inadvertently received in the passage 41 as the chain link negotiates the sprocket wheel.

It should be noted that the uppermost and forwardmost leading edge 49 of the rear wall 48 lies in a plane P which intersects the longitudinal center of the link 30. In this position, the leading edge 49 of the back wall 48 will follow a true circumferential arc at a relatively uniform velocity as the bucket negotiates the end sprocket wheels 20.

As illustrated, it is thus clear that the laterally inner portions 72 and 74 of the bottom wall adjacent the longitudinal slot 70 are in abutting relation with the side bars 32 of links 30 to preclude the passage of product being conveyed therebetween. Likewisely, the tab 58, which overlies and bears against the upper surfaces of the link 30, inhibits the grain product being conveyed from passing downwardly between the side bars into the passage 41.

METHOD OF MAKING

Initially, a flat planer sheet is braked or bent at 59 to provide a generally planer flat bottom wall 46 and an upwardly, forwardly-projecting back wall 48. The rearward wall 48 is bent forwardly to a distance such that the forward uppermost leading edge 49 of the back wall 48 lies in a plane P which is equi-distant between the forward and trailing edges of the bottom wall 46.

A pair of generally planer, upstanding, generally triangularly-shaped end walls 50 are welded or otherwise suitably secured to the laterally outer edges 43 and 45 of the bottom wall 46 and back wall 48.

The bottom wall 46 is cut along parallel lines 52 and 54 from the leading edge 47 of the bottom wall 46 and thence upwardly along the lower portion of the rear wall 48 to a level represented by the reference character 56. The distance between the plane of the bottom wall 46 and the level 56 is greater than the vertical height of the side bars 32.

The tab 58 is then displaced upwardly, outwardly relative to the wall 46 to provide a longitudinally, rearwardly-extending slot 70 between the confronting laterally inner edge portions 72 and 74 of the bottom wall 46. The tab 58 is also bent to provide a longitudinally curvilinear portion 60 for receiving the upper portion 27 of the sprocket tooth 26.

the bucket thus formed is then installed on a conveyor link 30 by aligning the slot 70 with one of the chain links 30 and then downwardly, forcing the bucket 44 with the opposing confronting sides 72 and 74 frictionally bearing against the side surfaces 39 of the side bars 32, until the abutting edges 72 and 74 abut the lower terminal edges of the side bars 32 and the underside 47 of the bottom wall 46 is in bearing engagement with the upper surface of the divider wall 17.

As the bucket 44 is moved into position, the upper surfaces 42 of the side bars 32 will engage the underside of the tab 58 and will cause the tab 58 to be sprung upwardly slightly. The bucket 44 is then welded to the side bars 32.

ALTERNATE ENBODIMENT

Referring now more particularly to FIGS. 5-8, a slightly modified bucket construction is illustrated. Generally similar parts will be referred to by generally similar reference characters follows by the letter a subscript. The bucket 44a includes a bottom wall 46a having a notch 70a cut only in the bottom wall and terminating slightly forwardly of the trailing edge of the bottom wall 46a. Each chain link 30a includes a curvilinear cover, generally designated 58a, which is welded or otherwise suitably secured to the side bars 32a. The laterally inner edge portion 72a and 74a of the bottom wall 46a are mounted in abutting relation with the side bars 32a of the links 30a to preclude the passage of product being conveyed therebetween. The curvilinear tab 58a, which overlies and bears against the upper surfaces of the links 30a, inhibits the grain product being conveyed from passing downwardly between the side bars into the passages 41a. The tab 58a may suitably comprise the portion of material removed from the bottom wall 46a to provide the notch 70a.

It is to be understood that the drawings and descriptive matters are in all cases to be interpreted as merely illustrative of the principles of the invention, rather than as limiting the same in any way, since it is contemplated that various changes may be made in various elements to achieve like results without departing from the spirit of the invention or the scope of the appended claim.

What I claim is:

1. A bucket elevator for conveying product, such as grain, comprising:
   a hollow tubular elevator casing including:
   an outer wall;
   an inner wall; and
   a pair of laterally-spaced sidewalls
   spanning said outer and inner walls;
   sprocket wheel means mounted for rotation on said casing;
   endless chain means trained around said sprocket wheel means, including a plurality of links, each having a pair of laterally-spaced upstanding side bars pivotally coupled to the side bars of the adjacent links;
   a plurality of buckets attached to the links of said endless chain means;
   each of said buckets comprising:
   a bottom wall for slideably engaging said inner wall;
   a forwardly-inclined rear wall integral with said bottom wall; and
   a pair of laterally-spaced side closure walls spanning said bottom wall and said rear wall;
   said rear wall and said bottom wall including a pair of slits therein extending rearwardly from the leading edge of said bottom to define a tab therebetween which is integral, at the trailing end thereof, with said rear wall;
   said tab being upwardly displaced to provide a longitudinal slot in said bottom wall which receives one of said links, said tab being displaced to a level in which it will bear against the upper side of said one link to inhibit product being conveyed from passing downwardly between said side bars of said one link.

2. The elevator set forth in claim 1, wherein said tab includes an outwardly curvilinear portion interjacent the leading and trailing ends of said tab and interjacent the leading and trailing ends of said link to define a recess for receiving a portion of said sprocket wheel as said link negotiates said sprocket wheel.

3. The elevator set forth in claim 2, wherein the outermost forward edge of said back wall lies in a plane intersecting the longitudinal center of said one link.

4. A bucket elevator for conveying product, such as grain or beans, comprising:
   a hollow tubular casing including a pair of laterally-spaced side walls closed by spaced-apart inner and outer walls which span said side walls;
   sprocket wheel means, mounted for rotation on said casing, including a plurality of circumferentially-spaced chain-driving sprocket teeth;
   an endless conveyor chain, trained around said sprocket wheel means for movement in an endless path, including a plurality of swingably coupled links, which are, during at least a portion of said endless path, in sliding engagement with said inner wall; at least one of said links including a pair of laterally-spaced side bars having inner terminal surfaces which are in wiping engagement with aid inner wall and outer terminal surfaces, and a pair of longitudinally-spaced transverely disposed pins spanning said side bars to provide a sprocket tooth receiving passage between said side bars and said pins;

a bucket for conveying product, mounted on said one link comprising:

a pair of parallel side walls moiunted in said casing in wiping engagement with and parallel to said casing side walls, said side walls of said bucket including inner terminal edges adjacent said inner wall;

a bottom wall in wiping engagement with said inner wall, including a pair of laterally-spaced bottom wall segments fixed at their laterally outer edges to the inner terminal ends of said side walls, and having inner terminal edges abutting said side bars of said link;

an outwardly extending, forwardly projecting back wall, integral with said bottom wall and fixed to the side walls of said bucket; and a link cover for covering said sprocket tooth receiving passage in said link including;

a cantileverally supported forwardly projecting tab, having a rearward end integral with said back wall, and a free forward end in bearing engagement with said outer terminal surfaces of said link side bars.

5. The elevator set forth in claim 4, wherein the width of said tab is equal to the distance between the inner terminal edges of said bottom wall segments.

6. The apparatus set forth in claim 4, wherein the sprocket teeth are of such size relative to said chain link that the terminal ends of said sprocket teeth project outwardly beyond said outer terminal surfaces of said link side bars as said link negotiates said sprocket wheel means; said tab including an outwardly projecting curvilinear portion between the forward and rearward ends thereof to provide a recess to receive said terminal ends of said sprocket teeth.

7. The apparatus set forth in claim 4, wherein the outermost forward edge of said back wall overlies the longitudinal center of said link.

8. A bucket for a product-conveying elevator, including a hollow elevator casing having an inner wall, an outer wall and laterally-spaced side walls spanning said inner and outer walls, sprocket wheel means having a plurality of circumferentially-spaced sprocket teeth rotatably mounted on said casing, and an endless chain, trained around said sprocket wheel means and slidably engageable with said inner wall, including a plurality of pivotally coupled links having upstanding, laterally-spaced side bars, said bucket comprising:

a bottom wall for bearing against the inner wall of said casing; and an outwardly extending, forwardly inclined rear wall integral with said bottom wall;

said bottom wall and said rear wall including a pair of laterally spaced slits to define a cover tab therebetween, which is separated from said bottom wall and said back wall along the lateral edges thereof but is integrally coupled at the trailing edge thereof to said back wall;

said tab being outwardly displaced to a level above said bottom wall to provide a cover for one of said links, and a slot in said bottom wall for receiving said one link.

9. A bucket for a conveyor including a conveyor chain having a plurality of swingably connected links, at least one of said links including a pair of laterally-spaced side bars and a pair of longitudinally-spaced transverse pins spanning said side bars defining a tooth-receiving passage therebetween, said bucket comprising:

a bottom wall, an integral, outwardly-projecting back wall;

said bottom wall including a pair of laterally-spaced bottom wall portions having laterally inner edges spaced apart by a slot to receive said one link; and a cover shield for covering and bearing against said one link including a cantileverally supported, forwardly-projecting tang, having a rearward end integral with said back wall, and a free forward end supported in outwardly-spaced relation with said bottom wall portion.

10. A bucket for a conveyor, including a conveyor chain having a plurality of swingably connected links, at least one of said links including a pair of laterally-spaced side bars separated by an opening, comprising:

a bottom wall having a leading forward edge and a trailing edge;

an upwardly-projecting rear wall integral with the trailing edge of said bottom wall;

said bottom wall and said rear wall including a pair of laterally-spaced slits therein extending rearwardly from the leading edge of said bottom wall to define an elongate tab therebetween, said tab having a trailing end integral with said rear wall, and a free forward end;

said tab being bent upwardly out of the plane of said bottom wall to a level spaced from said bottom wall, to provide an elongate slot in said bottom wall for receiving said one link and to provide a shield for covering the opening in said one link.

11. The bucket set forth in claim 10, wherein said tab includes an outwardly curvilinear portion interjacent its leading and trailing edges.

12. The bucket set forth in claim 11 wherein said laterally-spaced slits extend rearwardly and upwardly along the lower portion of said rear wall, and said slit extends along the full length of said bottom wall and said lower portion of said back wall.

13. A method of making a conveyor bucket for a bucket elevator, including an endless chain having a plurality of pivotally-connected bucket mounting links, comprising the steps of:

forming a receptacle having a generally planar bottom wall and an upstanding integral rear wall;

cutting said bottom wall and said rear wall along two generally parallel lines extending rearwardly from the leading edge of said bottom wall to a level above said bottom wall, but below the upper terminal edge of said rear wall, to form a cantileverally-supported strip; and upwardly displacing said cantileverally-supported strip to a level above the plane of said bottom wall to provide a gap in said bottom wall for receiving one of said chain links and to provide a cover for the link received by said gap.

14. The method set forth in claim 13, further including the step of bending said tab to provide an outwardly-projecting curvilinear portion interjacent the leading and trailing ends thereof.

15. A method of making a bucket elevator, including rotatable sprocket wheel means and an endless chain trained around said endless sprocket wheel means, including a plurality of pivotally-coupled links, for conveying product, such as grain, comprising the steps of:
- forming a bucket receptacle having a bottom wall provided with leading and trailing edges and an integral, upstanding rear wall projecting upwardly from said trailing edge;
- cutting said bottom wall and said rear wall along two general parallel laterally-spaced lines which extend the entire length of said bottom wall, and thence upwardly along said rear wall a distance at least equal to the vertical height of said chain links, to provide a cantileverally-supported tab between the cut lines;
- upwardly displacing said tab to a level above the plane of said bottom wall to provide a longitudinal slot in said bottom wall; and
- mounting the receptacle on one of said links so that the link is received by said gap and the underside of the link is flush with the underside of said bottom wall, and said upwardly-displaced tab bears against the upper side of said one link.

16. The method set forth in claim 15, wherein said cutting is accomplished along lines which are laterally spaced apart a distance equal to the width of said one link; said mounting step being accomplished by frictionally engaging the laterally inner edge portions of said bottom wall adjacent the gap, with the lower terminal side edges of said one link to secure the receptable to said one link.

17. The method set forth in claim 15, wherein said displacing step includes the step of providing a curvilinear portion in said tab which projects outwardly relative to the leading and trailing edges of said tab.

18. A method of making a bucket elevator, including rotatable sprocket wheel means and an endless chain trained around said endless sprocket wheel means, including a plurality of pivotally-coupled links for conveying product, such as grain, comprising the steps of:
- forming a bucket receptacle having a bottom wall provided with leading and trailing edges and an integral, upstanding rear wall projecting upwardly from said trailing edge;
- providing a longitudinal slot in said bottom wall;
- mounting the receptacle on one of said links so that the link is received by said slot, and the laterally inner portions of said bottom wall adjacent said slot frictionally engage the laterally outer surfaces of said one link, and the underside of the link is flush with the underside of said bottom wall;
- cutting said bottom wall and said rear wall along two general parallel laterally-spaced lines which extend the entire length of said bottom wall, and thence upwardly along said rear wall a distance at least equal to the vertical height of said chain links, to provide a cantileverally-supported tab between the cut lines; and
- upwardly displacing said tab to a level above the plane of said bottom wall to a position in which said upwardly displaced tab bears against the upper side of said one link to cover the link.

* * * * *